J. W. BRYCE.
RECORDING LOCK SYSTEM.
APPLICATION FILED OCT. 20, 1919.

1,376,796.

Patented May 3, 1921.
6 SHEETS—SHEET 3.

INVENTOR
James W. Bryce
BY
Kerr, Page, Cooper & Hayward
his ATTORNEYS.

J. W. BRYCE.
RECORDING LOCK SYSTEM.
APPLICATION FILED OCT. 20, 1919.

1,376,796.

Patented May 3, 1921.
6 SHEETS—SHEET 4.

J. W. BRYCE.
RECORDING LOCK SYSTEM.
APPLICATION FILED OCT. 20, 1919.

1,376,796.

Patented May 3, 1921.
6 SHEETS—SHEET 5.

INVENTOR
James W. Bryce
BY
Kerr, Page, Cooper & Hayward
his ATTORNEYS

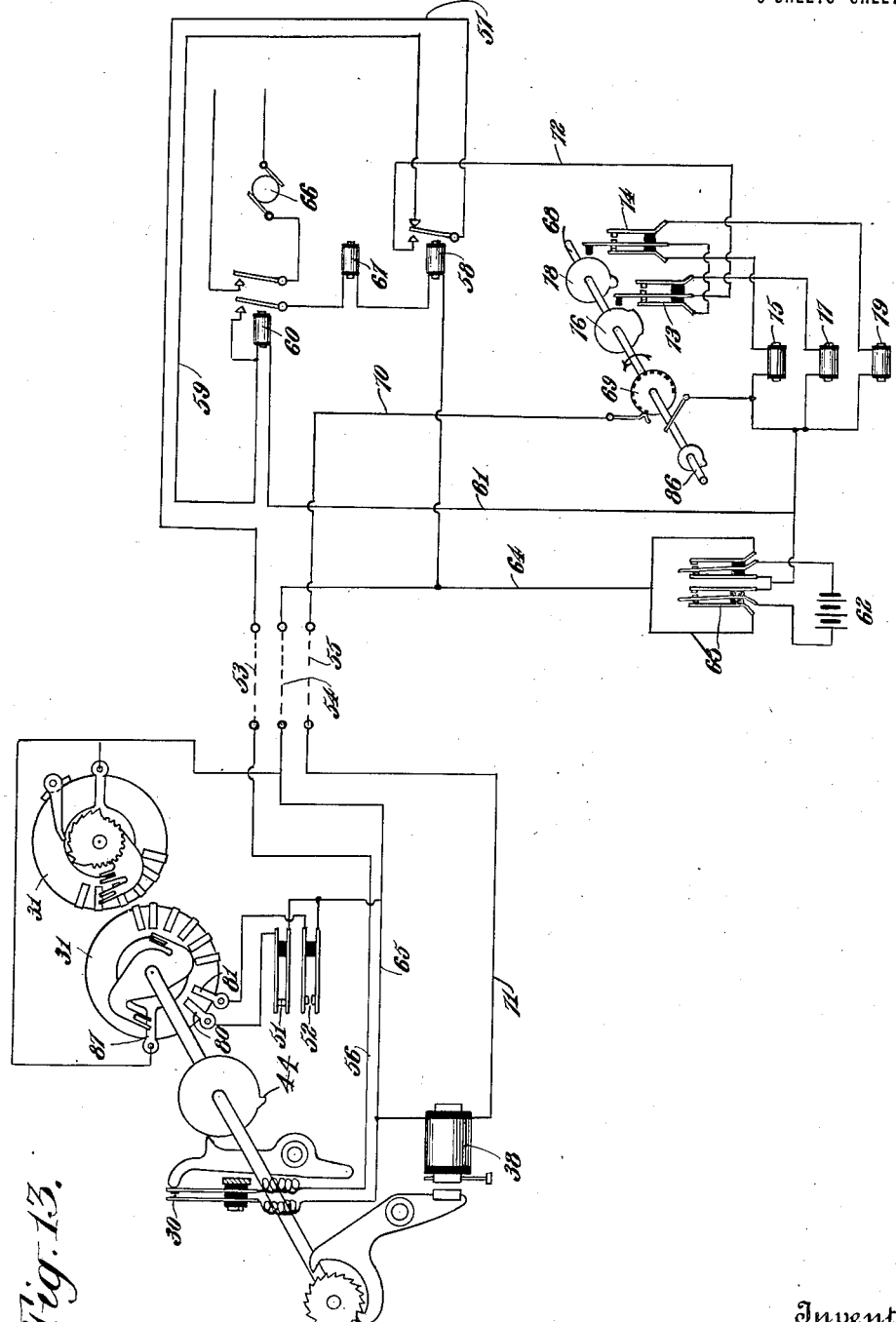

UNITED STATES PATENT OFFICE.

JAMES W. BRYCE, OF BINGHAMTON, NEW YORK, ASSIGNOR TO THE INTERNATIONAL TIME RECORDING COMPANY, OF NEW YORK, A CORPORATION OF NEW YORK.

RECORDING LOCK SYSTEM.

1,376,796.     Specification of Letters Patent.     Patented May 3, 1921.

Application filed October 20, 1919. Serial No. 331,767.

*To all whom it may concern:*

Be it known that I, JAMES W. BRYCE, a citizen of the United States, residing at Binghamton, in the county of Broome and State of New York, have invented certain new and useful Improvements in Recording Lock Systems, of which the following is a full, clear, and exact description.

The invention for which I now seek protection by Letters Patent is an improvement in recording lock systems. The primary objects that I have had in view in the development of my improvement are to simplify the electrical mechanism of the lock proper, to reduce to a minimum the number of circuit wires between the locks and the recorder, to simplify the construction of the lock, chiefly by dispensing with all forms of friction governors for preventing a too rapid and improper operation of the same, to avoid the separation in the lock of line contacts with the attendant destructive effects of arcing and corrosion, and in general to produce a more rugged or less delicate lock mechanism, and to accomplish all of these results with as little change as possible from the mechanism now used in locks and systems of this character.

In carrying out my invention I use in the lock some form of spring motor which by the rotary movement of a key in the lock is wound up so as to store a certain amount of power. By the mere insertion of the key a series of contacts are set or adjusted and by any rotary movement of the key a circuit to the recorder is closed which contains a motor that operates a transmitter that sends impulses back over the line to the lock or locks, and by their periodic energization of an electro-magnet in the lock control an escape wheel which rotates step by step under the influence of the stored power to turn a contact arm which, touching the set or live contact, operates a magnet in the recorder to indicate the designating letter of the particular key used in the lock.

The rotary movement thus imparted to the key-indicating mechanism, is also utilized to send to the recorder a signal corresponding to and indicating the particular lock operated, for which purpose a disk attached to the key indicating mechanism has a projection at a given point corresponding to the lock member which encounters at another part of the cycle and closes the same contacts that set the recorder motor in operation, and thereby sends over the same line an impulse that operates, in the recorder, the lock indicator.

The same line contains and controls non-interference means that lock against operation all other locks in the system except that which has been started by the insertion and rotation of a key, and other devices for indicating whether a key has been inserted from the inside or the outside, and such other information as is required in systems of this character.

My improved system is illustrated in the accompanying drawings in which:

Fig. 13 is a diagram illustrating the operation of the system as a whole.

Similar reference numerals indicate corresponding parts in the several figures.

The lock mechanism proper is of the usual and ordinary construction, and requires but passing description. It is contained in a suitable casing 1, and is provided with a key-hole or receptacle 2 on each side, by means of which the lock may be operated from either side of the door.

Figure 2:
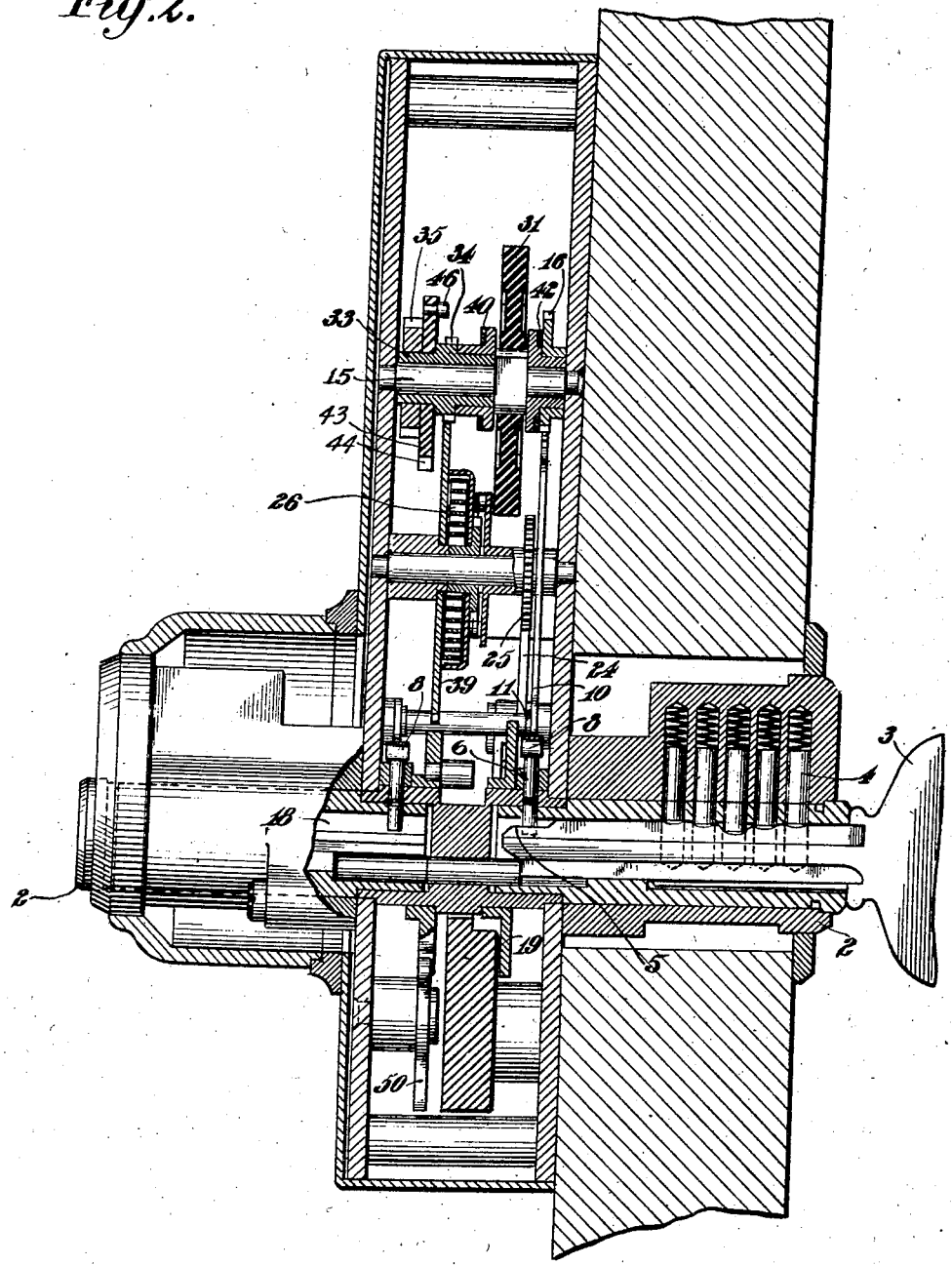
Fig. 2 is a vertical cross-section of the lock.
Figure 3:
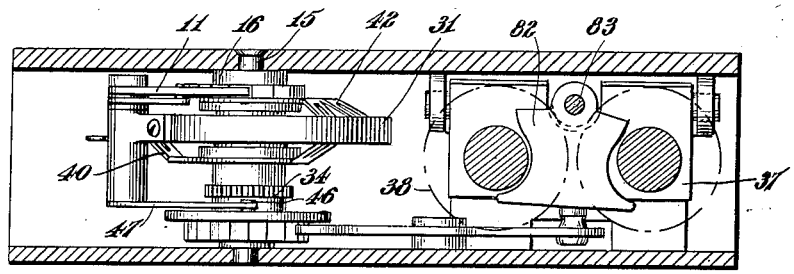
Fig. 3 is a horizontal section of the lock case looking from below and on a line about the center of the lock.
Figure 4:
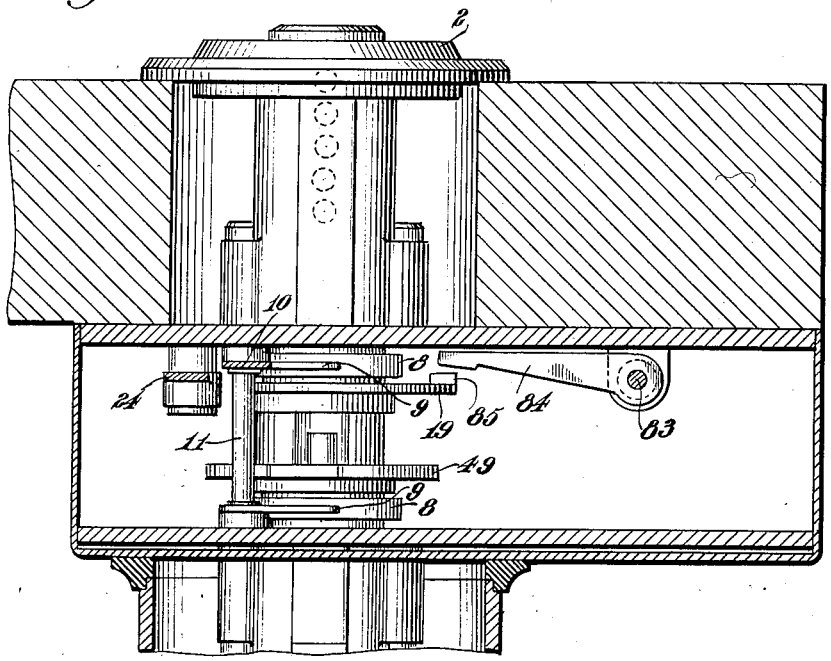
Fig. 4 is an enlarged detail of mechanism on a line above the key-receiving element.
Figure 6:
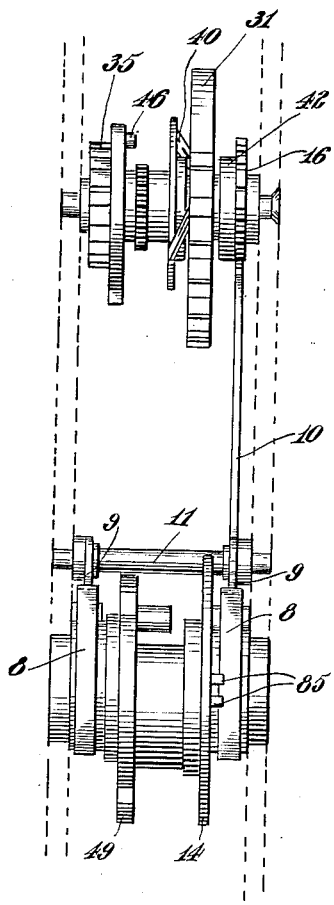
Fig. 6 is a detail of the setting mechanism of the lock in elevation.
Figure 5:
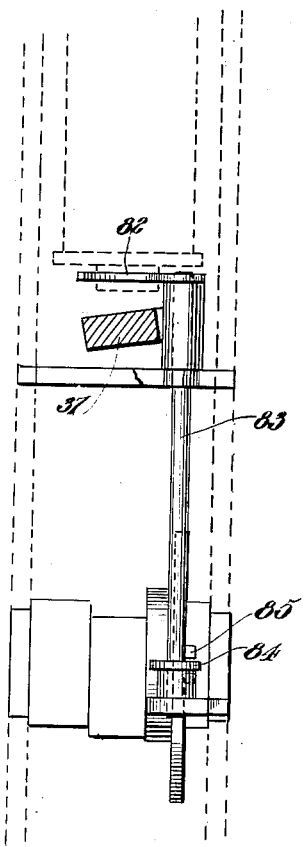
Fig. 5 is a sectional detail of a portion of the non-interference mechanism.
Figure 7:
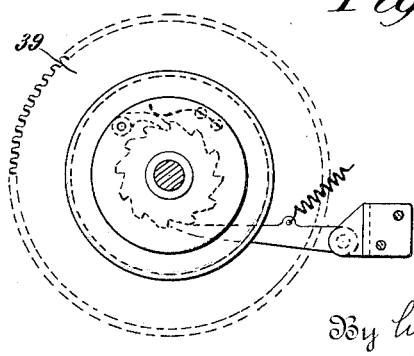
Fig. 7 is an enlarged detail of a gear wheel forming part of the setting mechanism.
Figure 8:
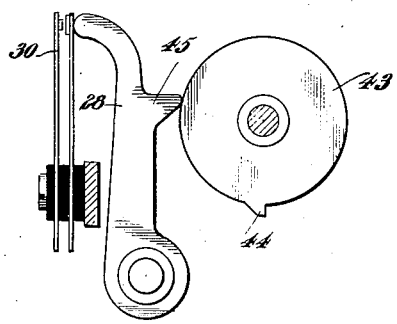
Figs. 8, 9, 10, 11 and 12 are details of the lock-setting mechanism.
Figure 9:
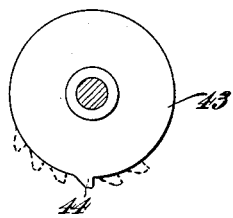
Figure 11:
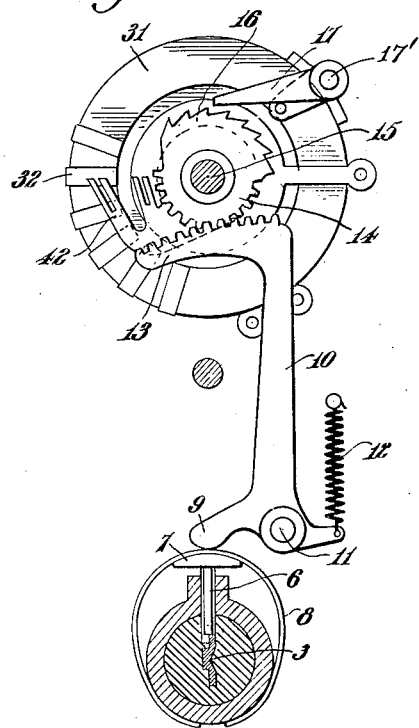

When a key 3, Fig. 2, is inserted into a lock, it sets in the usual manner the lock tumblers 4. Its end is extended and formed with a ledge or shoulder 5, however, which varies in height according to the particular key. This shoulder 5, Fig. 11, passes under the end of a stem 6 with a head 7, and raises the latter to a point determined by the height of the said shoulder. The head 7 is covered by a flexible band 8 which protects it from being engaged by any rotating parts of the lock, and which is distorted and raised by the insertion of a key.

Above the band 8 is the toe 9 of a lever 10, pivoted at 11, and this toe is engaged by the rising stem 6 and thereby caused to swing the lever 10 about its pivot against the force of a restraining spring 12. At the upper end of lever 10 is a rack arm 13 which engages with a toothed pinion 14 on a shaft 15, the upper half of said pinion having a series of ratchet teeth 16 with which engages a pivoted pawl 17, so that the pinion is set to a position which is determined by the particular key inserted into the lock.

Figure 12:
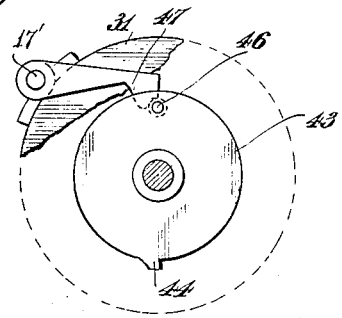

It will be noted that when no key is in the lock the pawl 17 is out of engagement with the ratchet 16. This is because of the fact that a pawl 47, Fig. 12, at such times rests upon the pin 46 in a disk 43, which, as will be explained, is rotated during the recording operation. Hence as soon as the disk 43 begins to turn pawl 47 drops and as it is in fixed relation to pawl 17 the latter drops into the teeth of the ratchet 16 before any other operation has taken place.

Figure 1:
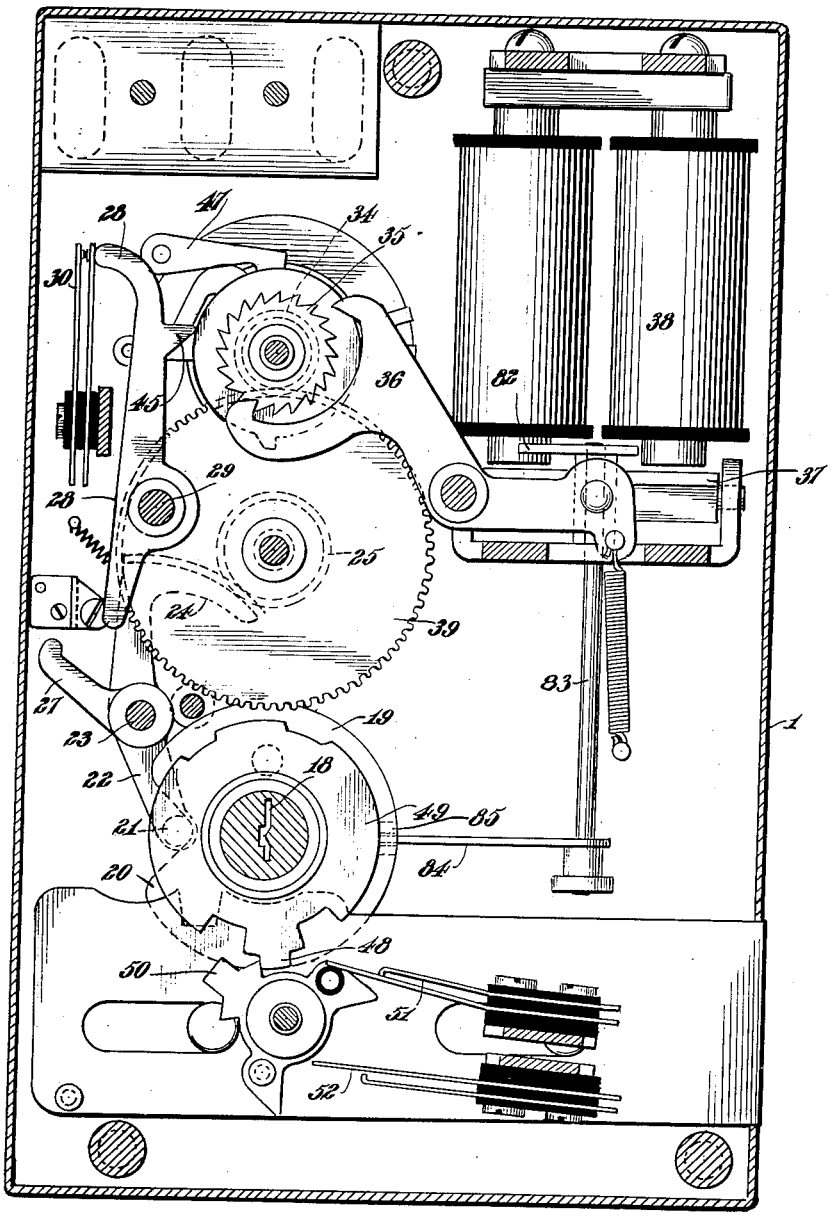
Figure 1 is a view partly in section and partly elevation of the lock on a greatly enlarged scale.

Assuming that a proper key 3 has been inserted in the key-hole 18, it may be turned, and when so turned it partially rotates a disk 19 having a depression 20 in its periphery in which normally rests a roller 21 at the end of a spring actuated lever 22, pivoted at 23, whereby such roller is thrown out of the depression and tilts the lever 22, which carries at its end a rack arm 24, Fig. 1, that engages with and turns a pinion 25 that operates to wind up a spiral spring 26.

The movement of the lever 22 during its initial stage also swings an arm 27 on the said lever or rigid therewith, which arm encounters the short arm of a lever 28, pivoted at 29, and throws the end of its long arm against a pair of contacts 30, closing them and establishing over the line a circuit over which an impulse flows that sets in operation a motor in the recorder.

On the shaft 15 of the ratchet 16 is a stationary disk 31 having a series of contacts 32, six generally in number, on its opposite faces. By the movement of the ratchet 16 in response to the insertion of a key, contacts 42 fast to the ratchet 16 are moved over this disk to bring one of these contacts 32 into connection with a source of current. On the same shaft 15 is loosely mounted a sleeve 33 carrying a pinion 34 in gear with a gear wheel 39, fast to pinion 25 and also carrying a ratchet wheel 35. Engaging with this ratchet 35 is a releasing pawl 36, rigidly connected with the armature 37 of an electro-magnet 38, so that for every impulse of current which passes through this magnet, the ratchet 35 is advanced one tooth under the impelling force of the spiral spring 26, wound up by the turning of the key in the lock.

Figure 10:
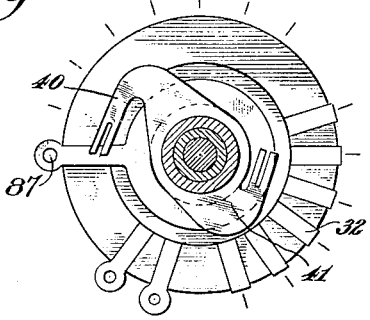

On the sleeve 33 is a pair of contacts 40 and 41, bearing respectively on a stationary conducting center plate of disk 31 and on the face of the disk near the periphery. These contacts travel step-by-step with the ratchet wheel 36, and hence when contact 40 comes into engagement with the live contact 32, a current impulse is sent over the line to the key indicator in the recorder. To better illustrate this operation one side of the disk 31 is shown in Fig. 10 and the reverse side in Fig. 11.

As the ratchet wheel 35 rotates it imparts rotation to a disk 43 which has a projection 44 at a predetermined point corresponding to the particular lock in which the disk is located. When this projection encounters a projection 45 on the lever 28 it forces said lever forward and again closes the contacts 30, sending to the recorder another impulse that, by means to be described, operates the lock indicating mechanism therein to show the particular lock used.

On the disk 43 is a pin 46 which, when the disk has made a complete revolution, raises a lever 47 and trips and releases the pawl 17 on the same pivot 17' so that the ratchet 16 always returns to zero position by spring 12 after each operation of the lock.

In addition to the elements above described as forming parts of the lock mechanism, the only further device that requires explanation for the moment is the full stroke pawl shown in Fig. 1. When the lock is thrown, a projection 48 on a disk 49 shifts a pivoted arm 50 that has projections that close either one or the other of the pairs of contacts 51 or 52. This, as will be described, indicates whether the key was used to lock or unlock the door.

Referring now to Fig. 13, which is a diagram of the system, the lock, one of any desired number, is shown at the left and the recorder at the right. The details of the latter are not shown, as they are well known in the art, but the system as a whole is distinguished by the fact that between the locks and the recorder but three line wires, 53, 54 and 55, are employed.

When a key is inserted in a lock and turned, the contacts 30 are closed, as has been described. This closes a circuit through lock wire 56, line wire 53, recorder wire 57, the back stop of a relay 58, wire 59, relay 60, wire 61, to one pole of the source of current 62 by one set of connections of a reversing switch 63, and thence back to the contacts 30 by recorder wire 64, line wire 54, and lock wire 65. This energizes relay 60 and draws up its two armatures, one of which closes the circuit of the recorder motor 66 and the other a path from wire 61, through the relay magnet 60, the relay 67, and relay 58 to wire 64 and back to battery, and draws up the armature of relay 58. The circuit of relay 60, however, remains closed by the new circuit connections established.

The motor having thus started by a momentary impulse, rotates a shaft 68 once, which carries a disk 69, with contacts thereon which send through a brush connected with wire 70 impulses of current on said wire 70, to line wire 55, lock wire 71 to the magnet 38 which operates step by step the contacts bearing on the disks 31.

The armature of relay 58 being now attracted has connected the wire 57 with a wire 72 leading through normally closed contacts 73 to normally closed contacts 74, to relay 75, which operates the device for indicating the key used. Hence, when the lock contact 40 meets a live contact 32, a current impulse flows over line wire 53, to and through relay 75 and to one pole of the source and back over line wire 54 to the other contact 30 and operates the key indicating device to show the particular key used.

This occurs during the first part of the cycle, but as the shaft 68 revolves its bearings bring a cam 76 into engagement with the contacts 73, by which for another part of the cycle, the wire 72 is connected through contacts 73 with relay 77, which controls the lock indicating device in the recorder. Hence, when the contacts 30 are again closed by the projection on disk 43, a current impulse passes through relay 77 and operates the lock indicating device in the recorder.

At another part of the cycle, after cam 76 has passed out of engagement with contacts 73, another cam 78 on shaft 68 engages contacts 74, so that the path from wire 72 is then through contacts 73, and the shifted contacts 74 to a relay 79, which controls the indicator of the in and out operation of the key.

It has been set forth in connection with Fig. 1 that the turning of the key in the lock operates the lever 50 in one direction or the other, and this operates to close contacts 51 and 52. For example, a person entering the door will close contacts 51 and thereby connect a contact plate 80 on disk 31 with wire 65, so that when the contact 40 comes on the plate 80 a current impulse is sent through magnet 79, because at that part of the cycle the circuit is made through such magnet and hence the recorder will indicate that the lock was opened from the outside.

When the contact plate 81 in a similar manner is rendered active the indication in the recorder will correspond.

By reference now to Figs. 3, 4, 6 and 7 the noninterference mechanism of the system will be understood. Between the poles of the electro-magnet 38 is a magnetized plate 82, mounted on a spindle 83 to which is rigidly secured an arm 84. On the underside of the disk 19 are two lugs 85 between which the end of arm 84 swings when the plate 82 is turned to one position by the attractive influence of the magnet poles.

Now when a key is inserted in a lock and then turned, a current impulse is sent over the line, as has been set forth, to start the recorder motor and the first impulse which then passes through the electro-magnet 38 attracts the plate 82 to that side (the said plate being magnetized) which tends to throw the arm 84 in between the two lugs on the disks 19 in all the locks in the system.

The particular lock which is being operated is not thereby locked against movement, as the two lugs on its disk 19 have been moved beyond the end of the arm 84 in the operation of sending the locking impulse. All the other locks, however, will be prevented from moving.

In the recorder on the shaft 68 (Fig. 13) is a third cam 86, which, near the end of the cycle, operates momentarily the switch or circuit changer 63, so that when the contact brush 40 comes onto a contact plate 87, a reversed current is sent through the magnets 38 of all the locks, which throws back the plates 82 and unlocks all of the locks leaving them free to be turned when necessary.

By the construction and arrangement herein described it is manifest that the number of line wires required is reduced to a minimum. It is also true that in the lock, there are no contact points which are separated for the purpose of breaking the circuit, and hence there is no arcing. Finally, it is evident that the element of time of operation of the lock becomes of little or no moment, as operation at any speed winds up a motor that is unwound at its own rate which may be anything that is predetermined.

What I claim as my invention is:

1. In a recording lock system the combination in each lock of a device for storing power operated by the normal movement of a key, a motive device for sending indicating impulses to line and a circuit controller closed by any rotary movement of said key, and in the recorder a motor adapted to be started by the operation of such circuit controller and means driven thereby to send over the line and to the lock impulses of current that control the operation in the lock of the motive device for sending the indicating impulses to the recorder.

2. In a recording lock system the combination in each lock of means under the control of the key for sending a starting impulse over the line, and means adapted to be set or adjusted by the key for sending indicating impulses over the line, and in the recorder a motor adapted to be set in operation by the starting impulse, recording devices, means operated by the motor for sending impulses back to the lock for operating the indicating impulse devices, and means for connecting the line at different parts of each cycle of operation with the several recording devices.

3. In a recording lock system, the combination in each lock of a motive device under the control of a key for sending over the line indicating impulses, and means also under the control of the key for sending over the line a starting impulse, and in the recorder a motor adapted to be set in operation by such starting impulse, means operated thereby to send impulses back to the lock for operating the indicating impulse mechanism therein, means for recording such impulses and means for directing the impulses therethrough at the proper times.

4. In a recording lock the combination of a means for storing power operated by the normal movement of a key, means for sending indicating impulses over the line to a recorder adapted to be set or controlled by a key when inserted and turned in the lock and operated by said power storing means, and means operated by any rotary movement of a key for sending over line an impulse of current that operates to start and control the operation of the indicating mechanism in the lock for the purpose set forth.

5. In a recording lock the combination of an electric line controlled impulse motive device in the lock, means operated thereby for sending indicating impulses to line, and means operated by any rotary movement of a key in the lock for sending over the line an impulse of current that operates to start and control the operation of the motive device in the lock.

6. In a recording lock the combination with a spring adapted to be wound by the rotary movement of a key in the lock, a line controlled motive device operating in conjunction therewith, means operated thereby and under the control of the key for sending to line key, lock and other indicating impulses, and means operated by any rotary movement of the key for sending a starting impulse to line that effects the operation of the motive device of the lock.

7. In a lock recording system the combination with a lock and a recorder, of means in the lock adapted to be set or controlled by the insertion and rotation of a key therein to send indicating impulses to the recorder, and means operated by any rotary movement of the key for sending over line a starting impulse to set in operation the indicating impulse mechanism, means in the recorder for electrically controlling the operation of the lock impulse means, recording devices and means for directing the impulses from the lock through such devices at the proper times.

8. In a recording lock system the combination with a lock, line wires and a recorder, of a line controlled impulse motor in the lock, means operated thereby and adapted to be set or controlled by the insertion and rotary movement of a key in the lock to send indicating impulses to line, and means operated by the key for sending a starting impulse to line, and a motor in the recorder adapted to be set in operation by such starting impulse, means operated thereby for sending impulses back to the lock motor, and means for recording key letters, lock numbers and other data corresponding to such impulses, and means for connecting the same with the line at the proper times.

9. In a recording lock system the combination with a recorder, a plurality of recording locks and line wires connecting the same, of a polarized locking device in each lock and means controlled by any rotary movement of a key in a lock to throw out of operation its own locking device but to send a current impulse over the line that sets all the other locking devices into operative position.

10. In a recording lock system the combination with a recorder, a plurality of locks and line wires connecting the same, of a polarized locking device in each lock, means in each lock for operating the same by an electric impulse which prevents all the locks but the one in use from being operated, and means in the recorder for sending a reverse impulse at the end of each cycle of operation to release all the locks to operative condition.

In testimony whereof I hereunto affix my signature.

JAMES W. BRYCE.